UNITED STATES PATENT OFFICE.

JEAN DE COPPET, OF PARIS, FRANCE.

METHOD OF TREATING MINERALS CONTAINING NICKEL.

SPECIFICATION forming part of Letters Patent No. 484,875, dated October 25, 1892.

Application filed May 20, 1892. Serial No. 433,730. (No specimens.) Patented in France February 26, 1892, No. 219,699.

*To all whom it may concern:*

Be it known that I, JEAN DE COPPET, a citizen of France, residing at Paris, France, have invented certain new and useful Improvements in the Art of Treating Minerals, Mattes, Speiss, and other Substances Containing Nickel for the Separation of Copper, Nickel, and Cobalt, (for which I have obtained a French patent, No. 219,699, dated February 26, 1892;) and I do hereby declare the following to be a full, clear, and exact description of the invention, such as will enable others skilled in the art to which it appertains to make and use the same from the following specification.

My invention may be carried into effect through the instrumentality of such well-known apparatus as is generally to be found in metallurgical laboratories, and therefore a full understanding thereof may be had from the following description without the aid of drawings.

My invention is applicable in whole or in part to copper, nickel, and cobalt pyrites, to the mattes or speiss obtained by their fusion, as well as to the speiss obtained by treating the mineral oxides, silicates, or other salts of nickel.

The principal object of the present invention is to provide a simple, expeditious, and economical method for analytically treating substances containing, in addition to sulphur and impurities, metals, of which the most important are nickel, cobalt, copper, and iron, to effect the separation of either nickel or cobalt free from copper, or nickel and cobalt mixed together but containing no copper, or nickel or cobalt containing iron but free from copper.

My invention consists of the art of separating cobalt from minerals, mattes, speiss, and other substances containing cobalt, nickel, and copper by reducing the cobalt of the mineral to a metallic state and separating the metallic cobalt from the nickel and copper by means of an acid solution of copper having the temperature of the surrounding atmosphere.

My invention further consists in the art of treating minerals, mattes, speiss, and other substances containing nickel for the separation of the nickel from the copper by reducing the nickel to a metallic state and then separating the metallic nickel from the copper by means of a hot-acid solution.

In order that the scope of my present invention may be understood by those skilled in the art to which it appertains, a general description thereof will be given with the reservation in that connection of the right to protect parts thereof by applications for patents to be filed as divisions of the present application, and I will then point out in the claims the particular part of the invention covered in and by this application.

Pure nickel and pure cobalt may be obtained from a substance or mineral containing, in addition to sulphur and impurities, metals, of which the most important are nickel, cobalt, copper, and iron, by practicing the following six steps or operations comprising the method which embodies my invention.

The first step or operation consists in refining the matte—that is to say, separating the iron from the substance or mineral containing, in addition to sulphur and impurities, metals, of which the most important are nickel, cobalt, copper, and iron. The matte may be refined by the removal of iron therefrom by either the dry or wet process, preferably by the dry process. Any efficient method or methods for removing the iron by the dry process may be employed, because such methods do not constitute the novel features of my invention and are only a preliminary step in the practice thereof. In practice this separation or elimination of the iron is, however, never complete, and a small quantity of iron—usually one-half or one-quarter per cent—remains in the refined matte. This small quantity of iron, which is permissible in the nickel called "commercially-pure nickel," remains associated with the nickel contained in the refined matte throughout all of the operations hereinafter described, and is finally present in the commercially-pure nickel obtained. It is therefore to be understood that the expressions "pure or metallic nickel" or "pure or metallic cobalt" are not used in the following description to designate chemical purity, but are used to designate cobalt or nickel associated with that quantity of iron which is usually present in commercially-pure nickel or cobalt. Consequently the refined matte is substantially free from iron and contains nickel, cobalt, and copper, associated with acids or other radicals forming sulphides, suboxides, and other like compositions or compounds.

The second step or operation consists in roasting the refined matte, or, in other words, converting the compounds of nickel, cobalt, and copper into sulphates or other soluble salts and oxides of these metals.

The refined matte may be roasted by crushing it and then treating the crushed mass in a reverberatory furnace. The fire in the furnace is regulated in such manner that an oxidizing-flame is produced, and this flame by imparting oxygen to the compounds of nickel, cobalt, and copper transforms them into sulphates and oxides of these metals. The crushed matte may also be subjected to the action of chlorine, or, in other words, chlorinated during the roasting operation, in order to partially or completely transform the compounds of the metals, nickel, copper, and cobalt into chlorides or other soluble salts and oxides. The roasted and refined matte contains sulphates or other soluble salts and oxides with or without chlorides of cobalt, nickel, and copper.

The third step or operation comprises the preparation of an attacking liquor or reagent by the operation of methodical or repeated lixiviation. This step or operation may be omitted, in which case the reagent is obtained from some source other than the minerals being treated. This liquor or reagent may be obtained by dissolving some or all of the salts that are contained in the refined and roasted matte in a suitable liquid, as water, with or without the addition of sulphuric or hydrochloric acids. To accomplish this result, the refined and roasted matte is placed in the series of tanks that constitute a well-understood lixiviation cistern. The lixivium may consist of water or of water acidulated with sulphuric or hydrochloric acid and flows from the highest to the lowest tank, so that the liquor which flows from the lowest tank contains sulphates or chlorides or a mixture of these two soluble salts of the greater portion of the copper, nickel, and cobalt that were contained in the roasted and refined matte. It is not necessary that all of the soluble salts should be dissolved. It is sufficient if the quantity of copper contained in the dissolved salts is equivalent (taking into consideration the atomic weights) to the quantity of cobalt, nickle, and iron contained in the oxides remaining undissolved. Thus, for example, if the quantity of nickle and cobalt remaining in the state of oxides is fifty-nine kilograms, or 129.8 pounds, the liquor or reagent should contain at least 63.5 kilograms, or 139.7 pounds of copper in solution. In some instances the refined and roasted matte does not contain enough copper for the lixiviation to produce a liquor or reagent sufficiently rich in copper. In such case the liquor may be brought to the required state or condition by the addition of a supplementary quantity of sulphate of copper. It may be remarked that the lixiviation with or without acid and whatever may be the kind of acid employed is only an economical method of obtaining an attacking liquid or reagent sufficiently rich in sulphate or chloride of copper to perform the subsequent operations. For the sake of a further description it will be assumed that sulphuric acid was employed in the lixiviation process and that the reagent or attacking liquid consists of a solution of sulphate of copper. The residuum undissolved by lixiviation or washing contains a mixture of the oxides of nickel, cobalt, and copper.

The fourth operation or step consists in the reduction of the oxides of copper, nickle, and cobalt, and is carried into effect in the following manner: The residuum of the lixiviation or washing operation contains a mixture of the oxides of nickel, cobalt, and copper, and is submitted after washing and drying to the action of a gas or of any other deoxidizing or reducing substance or material at a temperature that will not cause fusion of the copper and nickle. The temperature corresponding to a dull-red color has been found efficient in practice. A pulverulent mixture of metallic nickel, cobalt, and copper is thus obtained. This pulverulent mixture is then treated with the attacking liquid or reagent, which in the present instance consists of a solution of copper sulphate in the following manner:

The fifth operation consists in the removal of the cobalt from the pulverulent mixture by means of the reagent. The pulverulent mixture is immersed in a solution comprising, in the present instance, a solution of copper sulphate at the temperature of the surrounding atmosphere; or, in other words, in a cold state or condition. Under these circumstances the nickel remains inactive and the sulphate of copper is destroyed or chemically split up, and the acid radicals thereof unite or combine with the metallic cobalt to form soluble sulphate of cobalt, and the copper is precipitated in a metallic state or spongy condition. The whole of the metallic cobalt is thus converted into sulphate of cobalt and is removed from the nickel and copper by repeated or methodical washings with the attacking liquor, and a quantity of copper equal to the cobalt so removed is precipitated in a metallic state or condition. This liquor of pure sulphate of cobalt is separated from the residuum of the cold precipitation, which latter contains a mixture of metallic nickel and copper. This mixture of metallic nickel and copper is treated with a fresh quantity or quantities of the attacking liquid or reagent in a heated condition. Under these conditions—namely, the presence of a heated solution of sulphate of copper—the metallic nickel acts in its turn in the same manner as the cobalt upon the attacking liquor, with the result that the nickel unites with the acid radicals of the sulphate of copper and forms soluble sulphate of nickel, and the metallic copper thus liberated collects as a precipitate. Thus the complete separation of the three metals—copper, nickel, and cobalt—is effected, and these metals occur in the following forms, viz: copper in the form of metallic sponge or precipitate free from nickel and cobalt, which is a merchantable product; nickel in the form of sulphate in solution and free from cobalt and copper; cobalt in the form of dissolved sulphate free from copper and nickel.

The sixth operation or step comprises the decomposition of the sulphates of cobalt and nickel. The sulphate of nickel and sulphate of copper may be crystallized out of their respective solutions by evaporation, thus obtaining merchantable compounds of these metals, or the two solutions may be mixed and then evaporated, in order to obtain crystals consisting of the double sulphate of nickel and cobalt. The crystals thus obtained may be decomposed by heat, in order to obtain oxide of nickel and oxide of cobalt separately or mixed, and these oxides may be reduced to the metallic state by any process usually employed for this purpose in the metallurgy of these metals.

It has been remarked that the first of the above-described steps or operations—namely, the removal of iron from the minerals or metal—may be omitted. In such case the resultant product is ferro-nickel—a salable commodity. The production of ferro-nickel comprises a modification of my invention, which may be carried into effect in the following manner: In this case the first of the above-described operations or steps is omitted, and the mineral containing nickel, iron, copper, and cobalt is directly operated upon or treated. The remaining five of the six operations or steps are conducted precisely as in the preparation of pure nickel—that is to say, first oxidizing or chlorinating the matte or previously-crushed mineral during the roasting operation, and then proceeding with the methodical lixiviation in order to obtain the attacking liquor or reagent. In this case, however, the proportion of copper dissolved in the lixivium must be sufficient to precipitate the entire bulk of the nickel, cobalt, and iron remaining in the state of oxides in the residuum of the lixiviation and not simply the total bulk of the nickel and cobalt, as in the case of the separation of pure nickel. The residuum of the lixiviation is after washing submitted to the action of a reducing or deoxidizing gaseous or solid body at a temperature preferably not exceeding a dull red, so as not in any case to attain the fusing-point of the copper and nickel. A pulverulent mixture of metallic nickel, cobalt, copper, and iron is thus obtained. This mixture is then treated with the attacking liquid in a heated state, (the treatment by the liquor in a cold state being omitted,) with the result that the whole of the copper is precipitated in the state of spongy metallic copper free from nickel and cobalt, while the nickel and cobalt in the form of sulphates mixed with sulphate of iron and free from copper pass into solution. This solution is evaporated to dryness and the resultant crystals of sulphates of nickel, iron, and cobalt are decomposed at a red heat. The sulphuric acid which is set free during the decomposition of crystals may be recovered and utilized, if necessary, for the lixiviation and preparation of a fresh quantity of the attacking liquor for use in the treatment of additional masses of minerals, and the residuum of the decomposition consists of oxide of nickel and cobalt mixed with oxide of iron and containing no copper. This residuum may be sold in this form or it may be reduced or fused and sold as ferro-nickel.

Having thus described the nature and objects of my present invention, what I claim as new, and desire to secure by Letters Patent, is—

1. The method of separating cobalt from minerals, mattes, speiss, and other substances containing cobalt, nickel, and copper, which consists in reducing the cobalt of the mineral to the metallic state and separating the metallic cobalt from the nickel and copper by means of an acid solution of copper having the temperature of the surrounding atmosphere, substantially as and for the purposes set forth.

2. In the art of treating minerals, mattes, speiss, and other substances containing nickel, the process of separating nickel from copper, which consists in reducing the nickel to a metallic state and separating the metallic nickel from the copper by means of a hot-acid solution of copper, substantially as and for the purposes set forth.

In testimony whereof I affix my signature in presence of two witnesses.

JEAN DE COPPET.

Witnesses:
R. M. HOOPER,
G. DE MESTRAL.